June 18, 1957  E. BARLOW  2,796,540
DYNAMO ELECTRIC MACHINES
Filed July 8, 1954  2 Sheets-Sheet 1
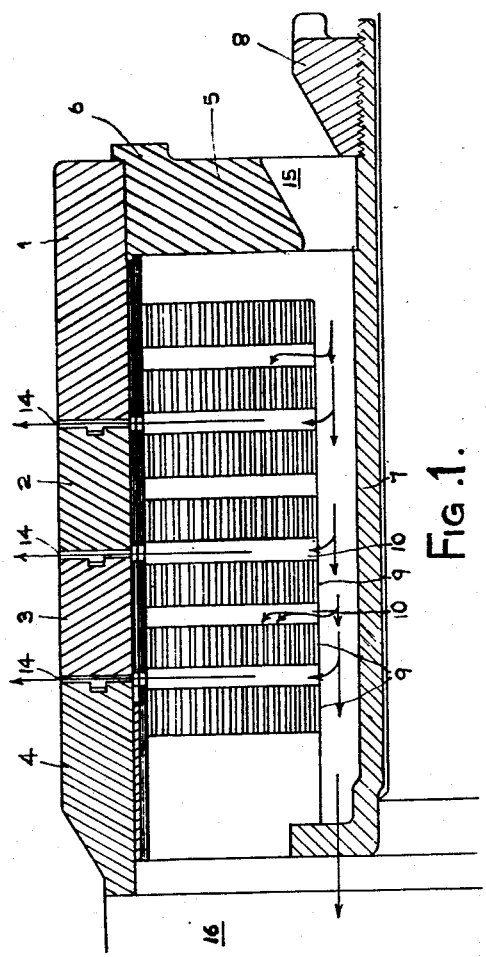
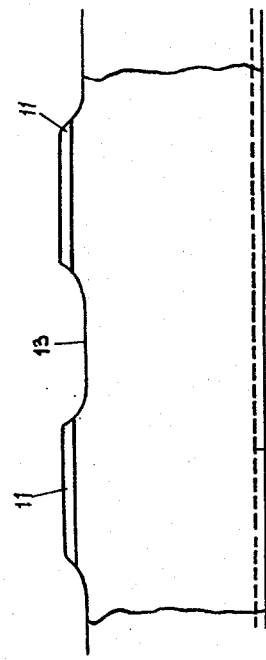
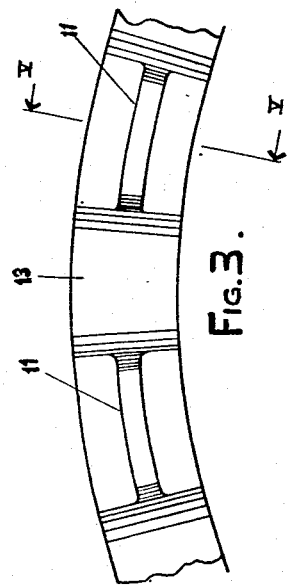
INVENTOR
Ernest Barlow
By Morris & Bateman
ATTORNEYS June 18, 1957  E. BARLOW  2,796,540
DYNAMO ELECTRIC MACHINES
Filed July 8, 1954  2 Sheets-Sheet 2
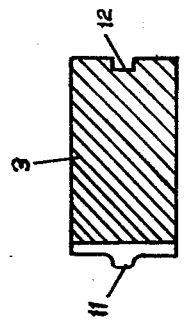
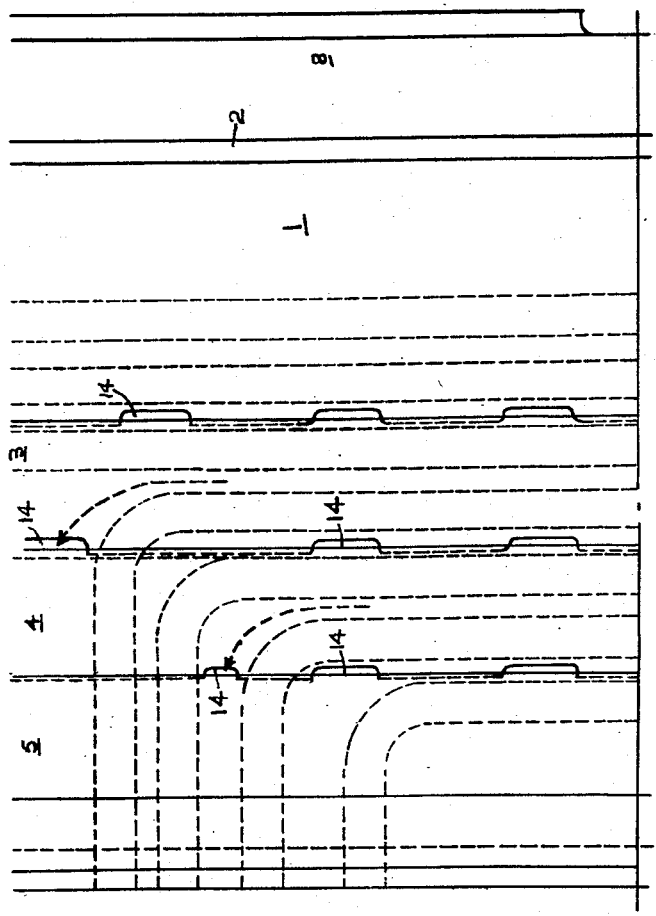
INVENTOR
Ernest Barlow
ATTORNEYS

United States Patent Office 2,796,540
Patented June 18, 1957

2,796,540

DYNAMO ELECTRIC MACHINES

Ernest Barlow, Sale, England, assignor to Metropolitan-Vickers Electrical Company Limited, London, England, a company of Great Britain Application July 8, 1954, Serial No. 442,162

Claims priority, application Great Britain July 13, 1953

3 Claims. (Cl. 310—61)

This invention relates to dynamo electric machines and more particularly to the rotors of high speed machines, e. g. turbo generators.

The invention is concerned with cooling the end windings of such machines.

It is customary in high speed turbo generators to provide a binding ring around the end turns of the rotor winding to resist centrifugal forces set up by these end turns when the rotor is rotating at speed. Such binding rings must of course be rigidly mounted and located axially. It will be appreciated that such a binding ring, whilst serving to resist the mechanical forces on the end turns of the winding, may tend to obstruct the dissipation of heat generated in the winding and it is, therefore, desirable to provide suitable ventilation paths for the end windings.

According to one known arrangement, cooling gas enters the end structure axially and passes along the outside of the shaft, past the end winding, into cooling ducts in the rotor core. Such an arrangement, however, has the disadvantage that whilst the inner parts of the end windings are cooled by the gas, the outer parts, which abut against the binding ring, may be insufficiently cooled, and moreover, the air available for cooling the rotor has already been heated to a certain extent by the end winding.

In order to increase the gas flow over the end winding, radial holes have been provided in the binding ring; these allow part of the gas to pass radially outwards over the end turns and then out through the radial holes. Such a construction improves the ventilation of the end winding and discharges most of the heated air directly instead of passing it to the core. At the same time the radial holes tend to reduce the mechanical strength of the binding ring, since by causing an uneven distribution of stress very large local stresses may be set up.

The main object of the present invention is to provide an improved arrangement in which ventilation of the end windings is improved, whilst at the same time the mechanical strength of the binding ring is not unduly impaired.

According to the present invention the binding ring around the end turns of the rotor winding of a high speed dynamo electric machine is formed in two or more sections which abut axially, each section comprising a complete annulus, and at least one of the abutting end faces of an adjacent pair of sections is formed with a series of axially extending bosses or protuberances circumferentially spaced around the section to provide intervening radial passages for cooling gas. Preferably, the bosses are in the form of circumferentially extending ribs which engage corresponding spigot slots in the end faces of the adjacent section thereby assisting in preventing relative movement between the sections.

The bosses may be integral with the sections or may be separate spacing members secured to the ends of the sections.

The arrangement may be such that the radial passages are located over the spaces between adjacent turns, or alternately in cases in which radial bores are formed in the conductors themselves the radial passages may be located over the conductor passages.

The cooling gas may, for instance, be air, hydrogen, or a liquid having a low vaporisation temperature such as Freon.

In order that the invention may be more clearly understood reference will now be made to the accompanying drawings, in which:

Fig. 1 is a radial section through the binding ring and end turns of the turbo generator rotor windings;

Fig. 2 is a plan view of the part shown in Fig. 1, i. e. it is a view of part of the peripheral face of the binding ring;

Fig. 3 shows part of the end face of a binding ring;

Fig. 4 is a view of part of the peripheral surface of a binding ring, i. e. it is a plan view of the part shown in Fig. 3; and Fig. 5 is a section on the line V—V of Fig. 3.

As shown in Fig. 1, the binding ring comprises an end section 1, two intermediate sections 2 and 3 respectively, and an axially inner section 4 adjacent the core; each of these sections is in the form of a complete annulus and they are arranged to abut end to end. 5 is an end disc having a shoulder 6 abutting against the end section, 7 is the rotor shaft and 8 is a rotor nut, which presses against the end disc 6 and holds the sections of the binding ring in position.

In the arrangement shown the end turns of the winding comprise seven coils, indicated by the reference 9; these are spaced apart axially by insulating blocks distributed around the circumference and spaced apart circumferentially so as to form radial passages 10 between the coils. In the particular arrangement shown the binding ring sections are formed on one face with a series of circumferential ribs 11 which engage a spigot groove 12 in the adjacent section. The spaces between the ribs 11 are recessed axially at 13 to form radial passages, as shown more clearly in Figs. 1 and 2.

Clearly the section 1 will only be formed with a rib and correspondingly the section 4 will only have a groove.

Thus, it will be appreciated in this arrangement, cooling gas will be drawn in through the openings 15 in the end disc 6 and will pass along between the inner sides of winding coils 9 and the periphery of the rotor shaft 7. Some of this gas will pass radially outwards along the passages 10 and as passages 10 are aligned with passages 14 the gas will in this case pass radially outwards to the periphery of the rotor. It will be appreciated that with this arrangement the full radial surfaces of the coils are subjected to gas cooling.

Whilst in the arrangement shown the passages 14 are aligned with the passages 10, it will be appreciated that in some arrangements radial passages may be formed in the actual copper strips forming the coils 9, and with such arrangements the passages 14 may be aligned with these conductor passages. In addition to the cooling of the end windings it will be appreciated that with many arrangements some of the gas may pass along axial ducts in the actual rotor core 16 and then out through radial passages, either through the core teeth between the slots or through the actual slots.

Whilst the arrangement shown has circumferentially extending spigot joints between sections, radial spigots may be provided to prevent relative rotational displacement between the binding ring sections. Such radial spigots may be additional to or instead of the circumferential spigot. It will be clear that the spigots shown are only examples and other suitable forms may be employed, or alternatively they may be dispensed with and the sections merely butted end to end.

What I claim is:

1. A high speed dynamo electric machine having a stator and a rotor, a winding to said rotor having end turns projecting axially beyond the ends of the core and a binding ring surrounding said end turns and comprising a plurality of interlocking annular sections distributed axially and with their end faces abutting axially, together with axially protruding ribs engaging in recesses in the associated end faces of an adjacent pair of sections, said ribs being spaced apart circumferentially, and walls defining axial recesses in said end faces between said ribs so as to provide radial gas passages.

2. A high speed dynamo electric machine having a stator and a rotor, a winding to said rotor having end turns projecting axially beyond the ends of the core, said end turns being spaced apart to define radial gas passages, a binding ring surrounding said end turns, said binding ring comprising a plurality of interlocking annular sections distributed axially and with their ends abutting axially, the end faces of adjacent abutting sections defining axial recesses which provide radial gas passages between the sections which register with the passages between individual end turns of the winding.

3. A high speed dynamo electric machine having a stator and a rotor, a winding to said rotor having end turns projecting axially beyond the ends of the core, said end turns being spaced apart to define radial gas passages, a binding ring surrounding said end turns, said binding ring comprising a plurality of interlocking annular sections distributed axially and with their ends abutting axially, the end faces of adjacent abutting sections defining axial recesses to provide radial gas passages between adjacent sections which register with the passages between individual end turns of the winding, means for locating the sections relatively to each other, and means for clamping the sections together axially, said clamping means defining axial gas passages communicating with the radial gas passages through the winding and binding ring.

References Cited in the file of this patent

UNITED STATES PATENTS

| | | |
|---|---|---|
| 1,913,264 | Cornu | June 6, 1933 |
| 2,094,358 | Kilgore | Sept. 28, 1937 |

FOREIGN PATENTS

| | | |
|---|---|---|
| 235,884 | Germany | June 24, 1911 |
| 338,014 | Great Britain | Nov. 13, 1930 |